(12) United States Patent
McCool et al.

(10) Patent No.: US 11,173,815 B2
(45) Date of Patent: *Nov. 16, 2021

(54) SUBMARINING AVOIDANCE SYSTEM

(71) Applicant: Waymo LLC, Mountain View, CA (US)

(72) Inventors: Courtney McCool, San Jose, CA (US); Thomas Daniel, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,090

(22) Filed: May 26, 2020

(65) Prior Publication Data

US 2020/0353849 A1 Nov. 12, 2020

Related U.S. Application Data

(63) Continuation of application No. 16/026,545, filed on Jul. 3, 2018, now Pat. No. 10,696,197.

(51) Int. Cl.
*B60N 2/433* (2006.01)
*B60N 2/90* (2018.01)
*B60R 22/02* (2006.01)
*B60R 22/48* (2006.01)

(52) U.S. Cl.
CPC .............. *B60N 2/433* (2013.01); *B60N 2/919* (2018.02); *B60R 22/023* (2013.01); *B60R 22/48* (2013.01); *B60N 2002/967* (2018.02); *B60R 2022/4808* (2013.01)

(58) Field of Classification Search
CPC .. B60N 2/433; B60N 2/919; B60N 2002/967; B60N 2002/948; B60R 22/023; B60R 22/48; B60R 2022/4808
See application file for complete search history.

(56) References Cited

U.S. PATENT DOCUMENTS

| | | |
|---|---|---|
| 4,900,079 A | 2/1990 | Obara et al. |
| 5,055,824 A | 10/1991 | Hamaue |
| 6,767,055 B1 | 7/2004 | Sparks |
| 9,073,506 B2 | 7/2015 | Baur et al. |
| 10,696,197 B2 * | 6/2020 | McCool ................ B60N 2/433 |
| 2011/0285186 A1 | 11/2011 | Demmelmeier et al. |
| 2014/0052342 A1 | 2/2014 | Seibert |
| 2014/0217787 A1 | 8/2014 | Fukuzawa |
| 2017/0036565 A1 | 2/2017 | Ohno et al. |
| 2019/0118681 A1 | 4/2019 | Daniel et al. |

FOREIGN PATENT DOCUMENTS

EP 1893436 B1 1/2013

* cited by examiner

*Primary Examiner* — Philip F Gabler
(74) *Attorney, Agent, or Firm* — Botos Churchill IP Law LLP

(57) ABSTRACT

Aspects of the disclosure relate to reducing the likelihood of injury to a passenger in a collision. In one example, a system for reducing the likelihood of a passenger submarining, may include a restraining device for restraining the passenger. A second restraining device for further restraining the passenger may also be included in the system. A locking mechanism may be configured to prevent a seat back from reclining when the second restraining device is not activated.

20 Claims, 10 Drawing Sheets

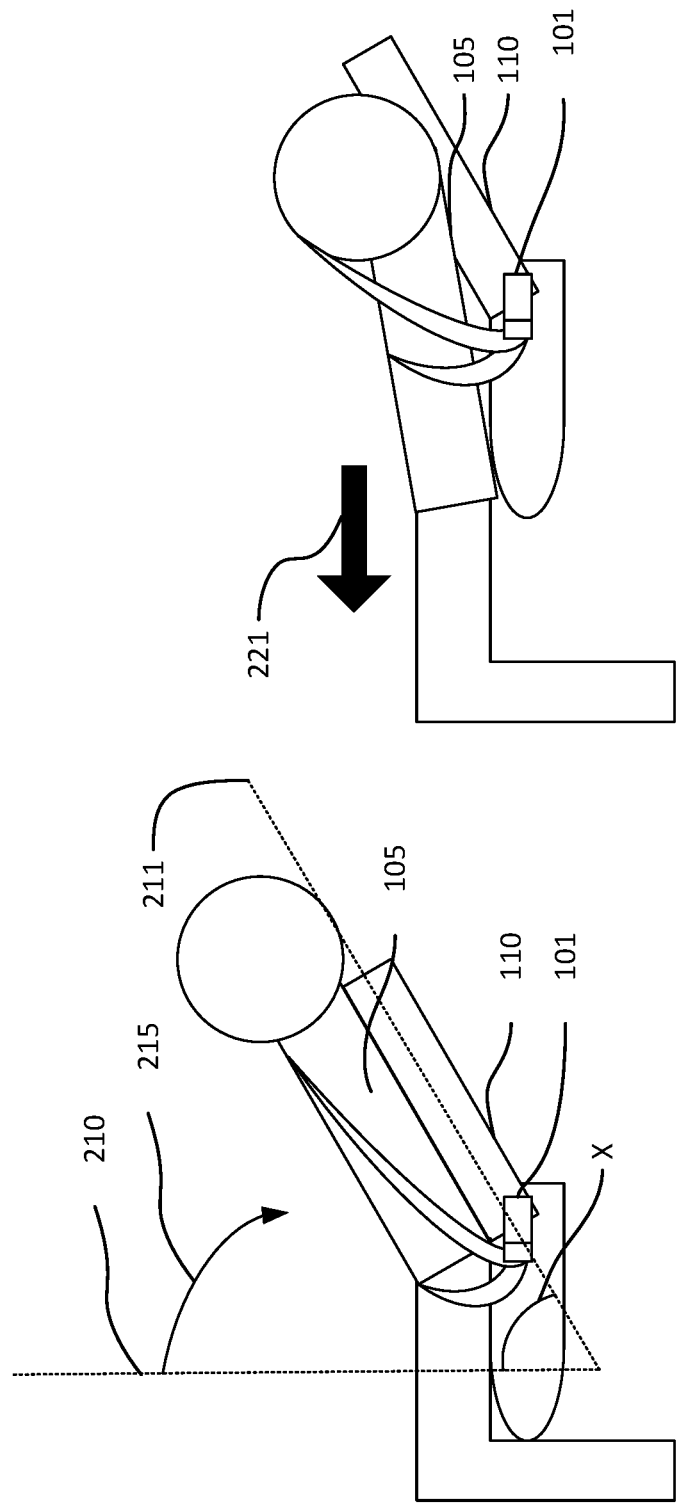

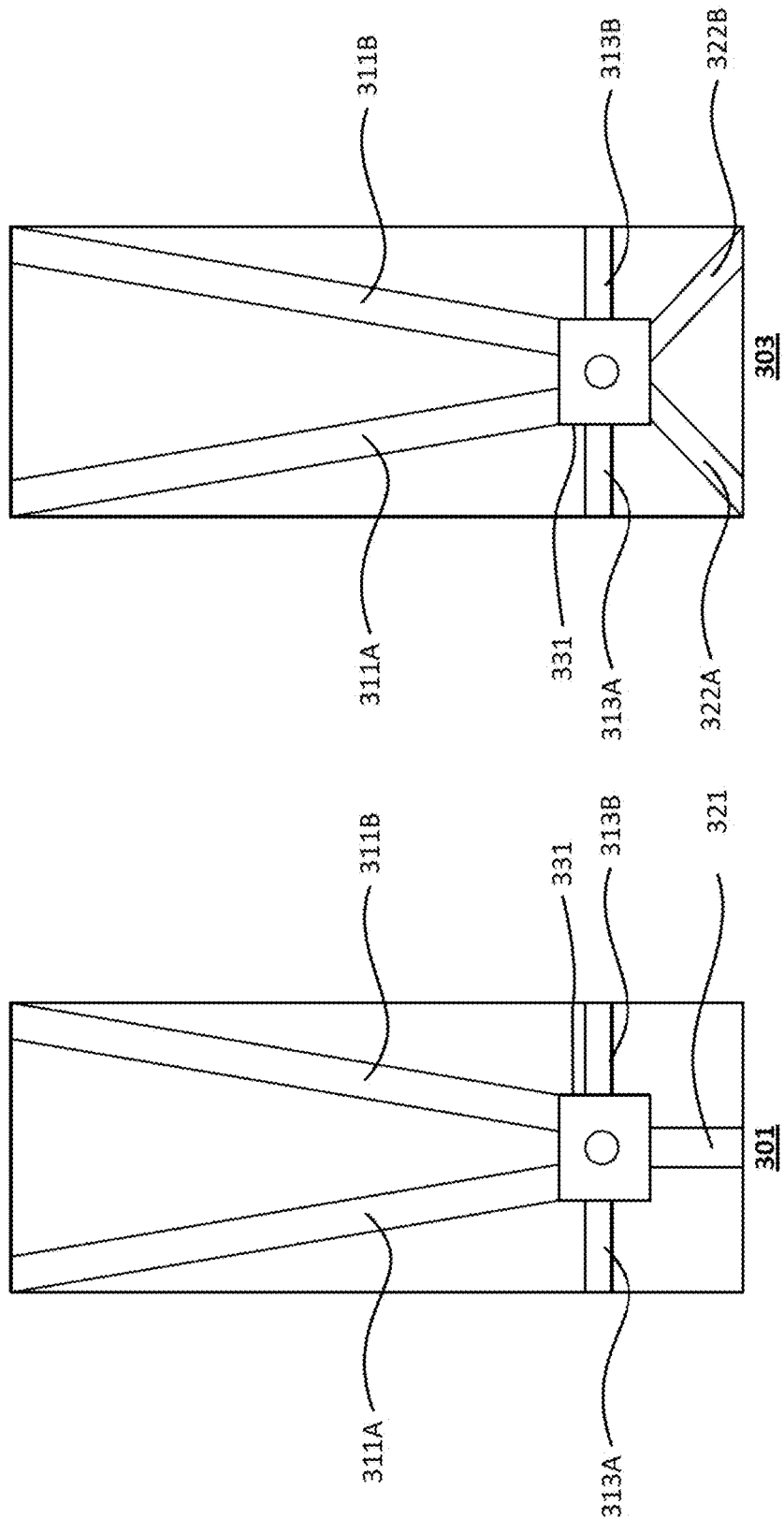

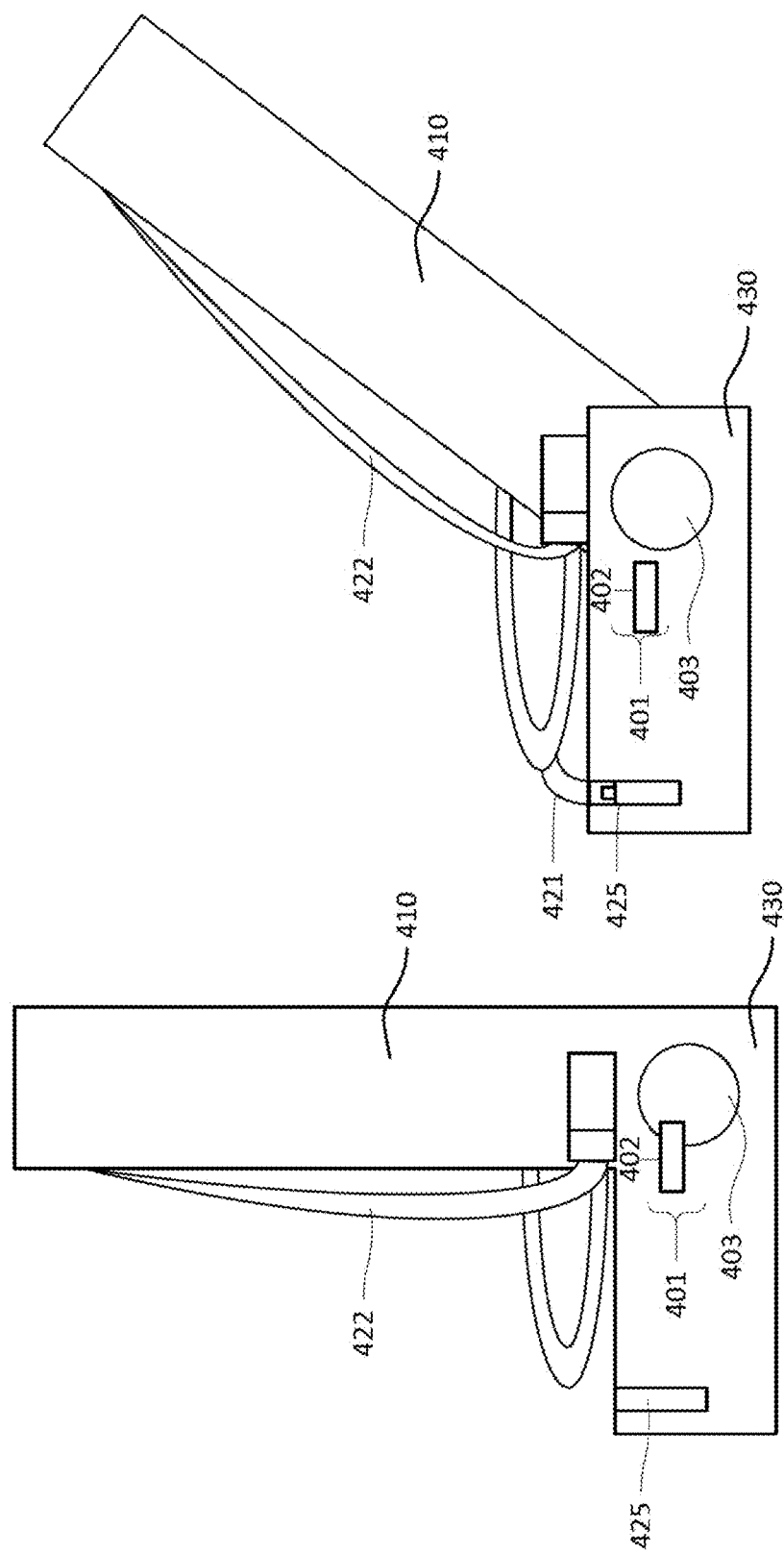

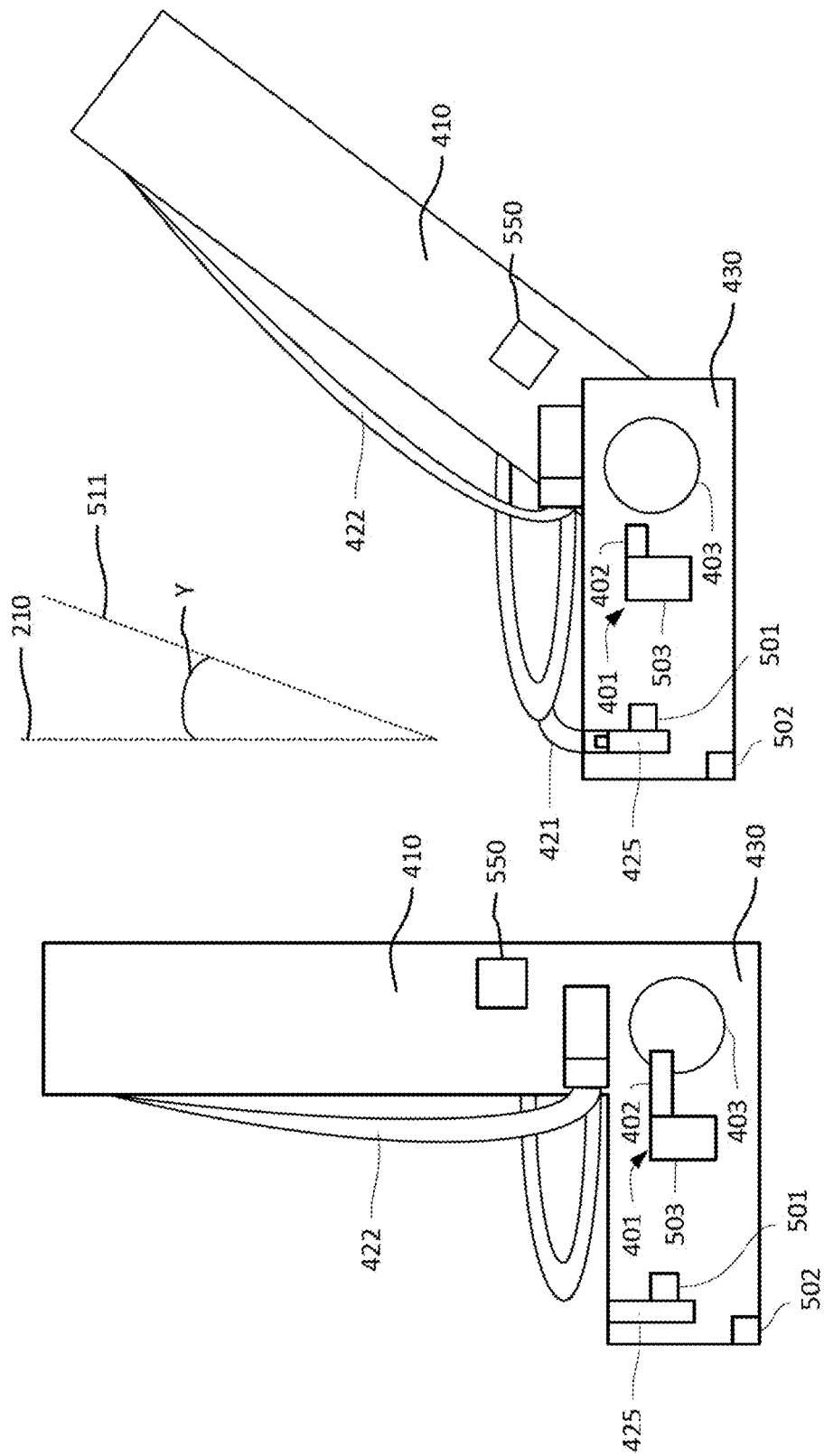

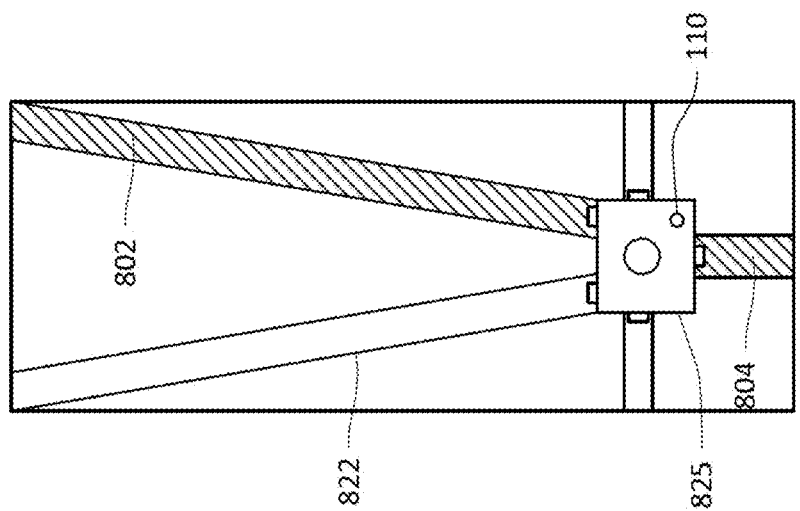
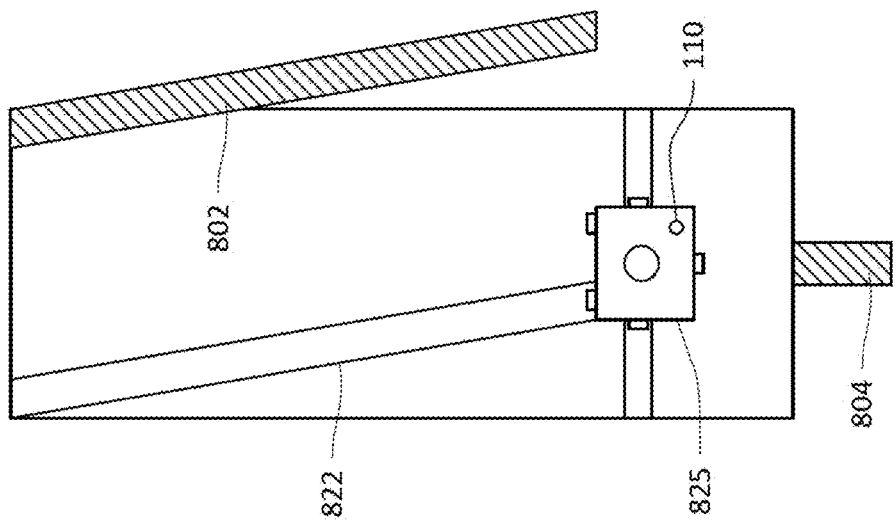

SUBMARINING AVOIDANCE SYSTEM

CROSS REFERENCE TO RELATED APPLICATIONS

The present application is a continuation of U.S. patent application Ser. No. 16/026,545, filed Jul. 3, 2018, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up and/or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as deciding when to speed up, slow down, stop, turn, etc. These decisions are used to maneuver between locations, but also to interact with and avoid collisions with other objects along the way.

When a collision actually occurs, non-autonomous and autonomous vehicles alike may include various safety mechanisms to reduce injury to passengers. Typically, the safety mechanisms may include passenger restraining systems, such as seatbelts, employed to protect passengers from impacts within the interior of a vehicle after an impact with another vehicle or object external to the vehicle.

BRIEF SUMMARY

Embodiments within the disclosure relate to systems for reducing the likelihood of a passenger submarining under a restraining device when reclined in a seat. In an embodiment, the system comprises a restraining device for restraining the passenger; a second restraining device for further restraining the passenger; and a locking mechanism, wherein the locking mechanism is configured to prevent a seat back of the seat from reclining beyond a predefined angle when the second restraining device is not activated.

In some instances, the locking mechanism is configured to allow the seat back to recline beyond the predefined angle when the second restraining device is activated.

In some instances, the restraining device is a three-point seatbelt.

In some embodiments the second restraining device includes a strap, wherein a first end of the strap is attached to the seat and a second, opposite end includes a tongue. In some instances, the system further includes a buckle mounted to the seat and the strap is looped onto a lap belt of the first restraining device. In some instances the system further includes a buckle and the second restraining device is activated upon the tongue being buckled into the buckle, and the locking mechanism is configured to allow the seat back to recline beyond the predefined angle upon the second restraining device being activated.

In some embodiments the system further includes a buckle and the second restraining device includes a shoulder strap and a leg strap. In some instances, a first end of the leg strap is attached to the seat and a second, opposite end of the leg strap includes a first tongue; and a first end of the shoulder strap is attached to the seat and a second, opposite end of the shoulder strap includes a second tongue. In some embodiments the second restraining device is activated upon the first and second tongues being buckled into the buckle, and wherein the locking mechanism is configured to allow the seat back to recline beyond the predefined angle upon the second restraining device being activated.

In some embodiments the second restraining device is integrated into a base of the seat. In some instances the second restraining device is attached to a lever, and upon the lever being rotated, the second restraining device is rotated above the base of the seat. In some instances the second restraining device is configured to automatically rotate above the base of the seat as the seat back approaches or reaches the predefined angle. In some embodiments the second restraining device is activated upon being rotated above the base of the seat and the locking mechanism is configured to allow the seat back to recline beyond the predefined angle upon the second restraining device being activated.

In some embodiments the predefined angle is around 30 degrees from vertical relative to the base of the vehicle.

In some instances the system includes a sensor, wherein the sensor is configured to determine whether the second restraining device is activated. In some instances the sensor is mounted within a buckle, wherein the second restraining device is configured to attach to the buckle.

In some embodiments the locking mechanism includes a brake for preventing the rotation of the seat back.

In some embodiments the locking mechanism includes an actuator and a blocking component.

In some embodiments the locking mechanism includes one or more cutout plates, each cutout plate having a cutout.

In some embodiments the actuator is configured to position the blocking component in the cutouts of the one or more cutout plates.

BRIEF DESCRIPTION OF THE DRAWINGS

FIGS. 2A and 2B are illustrations of a passenger reclining in a seat while wearing a three-point seatbelt in accordance with aspects of the disclosure.

FIG. 3A is an illustration of a five-point harness in accordance with aspects of the disclosure.

FIG. 3B is an illustration of a six-point harness in accordance with aspects of the disclosure.

FIGS. 4A and 4B are illustrations of a submarining avoidance system in accordance with aspects of the disclosure.

FIGS. 5A and 5B are illustrations of a submarining avoidance system including an actuator in accordance with aspects of the disclosure.

FIGS. 8A and 8B are examples of an optional restraining device in accordance with aspects of the disclosure.

DETAILED DESCRIPTION

This technology relates to a "submarining" avoidance system which prevents a passenger of a vehicle from submarining underneath a restraining device such as a lap and/or upper torso seatbelt during a change in acceleration of the vehicle. Changes of acceleration may include, for instance, when the vehicle decelerates quickly causing the passenger's forward momentum to carry them away from the seat. In order to prevent submarining, the seat may be configured to prevent itself from reclining when a seated passenger is not wearing a restraining device.

Figure 1:
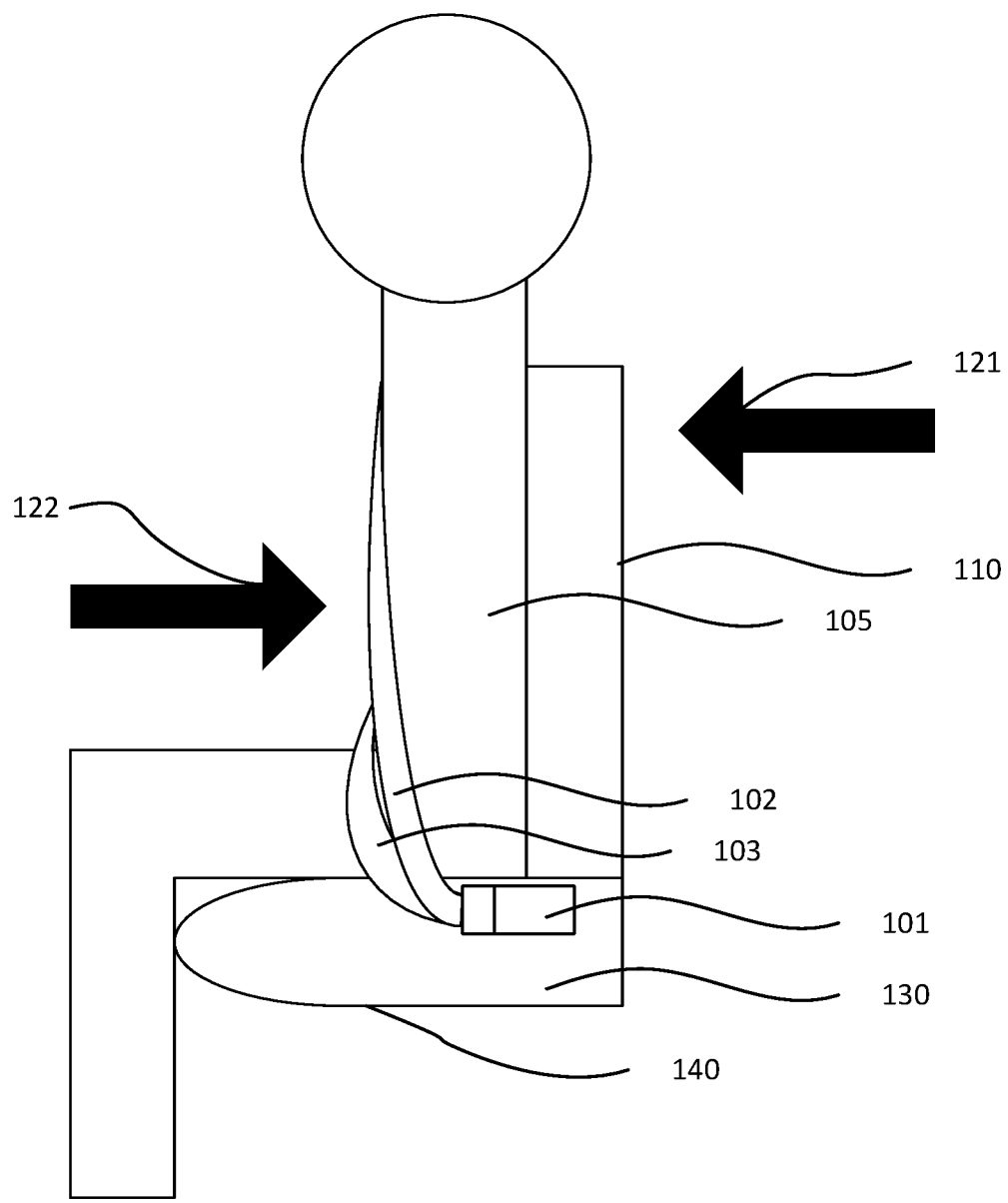
FIG. 1 is an illustration of a three-point seatbelt in accordance with aspects of the disclosure.

Typical vehicle restraining devices are designed to retain and protect a passenger seated in an upright position during a collision. For example, a restraining device, such as the three-point seatbelt 101 shown in FIG. 1, is configured such that the force generated by a passenger 105 seated upright in a seat 130, which has a seat back 110 and seat base 140, during a collision is directed into the seatbelt's lap belt 103 and shoulder strap 102. The seatbelt straps redirect the force generated by the passenger moving forward, as illustrated by arrow 121 back towards the passenger 105 in a second direction as illustrated by arrow 122. The force directed back towards the passenger 122 is distributed across the passenger's shoulders, upper torso, and lap, thereby keeping the passenger 105 in position while reducing the peak impact forces that would otherwise be felt by the passenger.

In instances where the passenger is reclined beyond a certain angular distance from an upright seating position, the force generated by momentum of the passenger is not substantially directed into the seatbelt's straps, such as shoulder and/or lap straps. For instance, as shown in FIG. 2A, the passenger 105 is reclined from vertical, relative to the direction of gravity or the ground beneath the vehicle, as illustrated by the angle "X" between vertical line 210 and angled line 211 corresponding to the position of the seat back 110 in FIG. 2A. Angle X may be 40 degrees, or more or less. In the event of a collision, the three-point seatbelt 101 may fail to restrain the passenger 105. In this regard, the momentum of the passenger 105 in the direction of arrow 221 may cause the passenger to submarine partially or completely under the seatbelt, as shown in FIG. 2B. In such instances, the seatbelt may increase the risk of injury to the passenger.

Other restraining devices may prevent a passenger seated in a reclined position from submarining under the restraining device during a collision by providing support between a passengers leg's and/or around the passenger's shoulders. For instance, a five-point harness 301 and six-point 303 harnesses, as shown in FIGS. 3A and 3B, respectively, provide support around the passenger's shoulders and lap, as well as between the passenger's legs and lower torso. In this regard, both the five-point harness 301 and the six-point harness 303 include two shoulder straps 311A and 311B, as well as two lap straps 313A and 313B. The five-point harness also includes a single leg strap 321 positioned between the passenger's legs while the six-point harness includes two leg straps 322A and 322B positioned between the passenger's legs.

The straps of the harnesses may each be attached on one end, to a vehicle seat and/or to the frame of the vehicle. The second, opposite end may include a fastener, such as a tongue, capable of connecting to another fastener, such as buckle 331, as further shown in FIGS. 3A and 3B. Although buckle 331 is shown, any connection mechanism, such as buttons, clasps, etc., may be used to attach or otherwise secure the belts. In this regard, the second, opposite end of the strap may include a corresponding connection mechanism. The lap and shoulder straps may secure a passenger's upper body and the leg strap(s) may prevent the passenger from submarining under the harness. However, such harnesses are usually cumbersome and inconvenient, such as in situations where the passenger is not expecting to recline as occurs on short trips or when the passenger needs to enter and exit the vehicle often.

To address these issues, a submarining avoidance system may be incorporated into the vehicle. The submarining avoidance system may include a locking mechanism which prevents the recline controls of a seat from reclining the seat (e.g., reclining the seat back,) beyond a predefined angular distance from an upright position, such as 30 degrees from vertical. The locking mechanism may be released upon a seated passenger buckling, or otherwise attaching and/or activating on an optional restraining device which prevents submarining.

The recline controls may control the recline angle of the seat back. In this regard, the recline controls may be any device capable of adjusting the angle of the seat back relative to an upright position. For instance, the recline controls may include an electronic actuator or mechanical lever.

The locking mechanism may prevent the seat back from moving into a recline position beyond a predefined recline range when in a locked state. The locking mechanism may disengage upon a passenger buckling, attaching, or otherwise activating the optional restraining device, thereby allowing the seat back to rotate beyond the predefined recline range.

The rotation of the seat may be controlled by one or more computing devices. In this regard, the computing device may monitor data captured from sensors to determine a user has attached, buckled, etc., an optional restraining device. Upon determining that the optional restraining device was attached, the computing device may enable or disable rotation of the seat by disengaging, or triggering the disengagement of the locking mechanism.

The optional restraining device may be any device capable of preventing submarining. In this regard, the optional restraining device may include be one or more straps positioned such that the momentum of a passenger in a reclined seat is arrested, thereby preventing the passenger from sliding under the restraining device. For instance, the straps may be configured, such that they are between the passenger's legs and/or lower torso and/or around the passenger's shoulders. In some instances, the seat may include an integrated optional restraining device that that could be rotated or translated between the passenger's legs and/or lower torso to prevent submarining.

The features described herein may allow for passengers of vehicles to safely recline in their seats during operation of the vehicle. In this regard, the submarining avoidance system may reduce the likelihood of a passenger submarining in the event of a collision or sudden slowdown of the vehicle. Moreover, the use of the submarining avoidance system may protect a passenger when their seat is rotated out of a forward facing position. Moreover, since the features described herein are optional, passengers are not inconvenienced should they not desire to rotate beyond a certain range. In addition, some submarining avoidance systems may automatically be deployed when a passenger rotates their seat into a position where a passenger is at risk for submarining.

As shown in the example seat submarining avoidance system of FIGS. 4A and 4B, a locking mechanism 401 may be incorporated into the recline controls 403 of the vehicle's seat 430, which may be compared to seat 130, having a three-point seatbelt 422. In this regard, the locking mechanism 401 may include a blocking component 402, such as a pin or other such structure which engages with the recline controls 403 to prevent the seat back 410 from moving into a recline position beyond a predefined recline range when in a locked state, as shown in FIG. 4A.

Once a passenger is buckled or otherwise secured by an optional restraining device 421, the locking mechanism 401 may be placed in an unlocked state. In this regard, the blocking component 402 may be disengaged, thereby allowing the recline controls 403 to recline the seat back 410 beyond the predefined recline range, as shown in FIG. 4B. For instance, the blocking component 402 may be a mechanically actuated pin which maintains an engaged position with the recline controls 403. Upon a fastener, such as a tongue, strap, button, clasp, etc., of an optional restraining device 421 being buckled into a buckle 425 or otherwise attached, the mechanically actuated pin may become disengaged, thereby allowing the seat back 410 to rotate beyond the predefined recline range, as shown in FIG. 4B.

The seat control system may include a controller 502, such as one or more microprocessors, processors, computer devices, etc. which may control the ability of the seat to recline. In this regard, the controller 502 may be connected via a wired or wireless connection, to one or more sensors, locking mechanisms, and/or recline controls. The sensor, such as sensor 501 as illustrated in the example seat submarining avoidance system of FIGS. 5A and 5B, may provide the controller with triggering signals indicating whether or not the optional restraining device is connected or disconnected. Based upon whether the triggering signals indicate whether an optional restraining device is attached or disconnected, the seat control system may enable or disable, respectively, the ability of the seat back to rotate beyond the predefined recline range.

The seat control system may control the locking mechanism of a seat, such as seat 430. In this regard, a sensor 501 may monitor one or more of the buckles or other attachment point, such as a strap clamp, clasp, hook, etc., of the vehicle's restraining device 422, such as buckle 425, as shown in FIG. 5A. Upon the sensor detecting that an optional restraining device 421 has been, for example but not limited to, buckled into the buckle, the sensor 501 may send a signal to the controller 502. In response, the controller 502 may send a triggering signal to the locking mechanism 401 to disengage from the recline controls 403.

In response to receiving the triggering signal, an actuator 503 within the locking mechanism 401 may cause the blocking component 402 to disengage from the recline controls 403, as shown in FIG. 5B. As such, the seat back 410 may be allowed to rotate beyond a predefined recline range, as illustrated by angle 'Y' between vertical line 210 and angled line 511 corresponding to the position of the seat back 10 in FIG. 5B. Angle 'Y' may be 30 degrees or more or less. Although an actuator 503 is described, a solenoid or other releasing mechanism may be used. In some instances, the sensor 501 may send a triggering signal directly to the locking mechanism 401 to disengage from the recline controls, thereby bypassing the controller 502.

In some instances rotation control system may include an actuator with a brake, such that the brake locks the rotation of the seat until the actuator receives an unlock signal to allow further rotation of the seat. In this regard, the rotation control system may function as a locking mechanism.

In the event the optional restraining device 421 is removed while the seat back 410 is in a reclined position, the recline controls 403 may automatically move the seat back to within the predefined angular distance 'Y' from an upright position, such as 30 degrees from vertical.

Figure 6B:
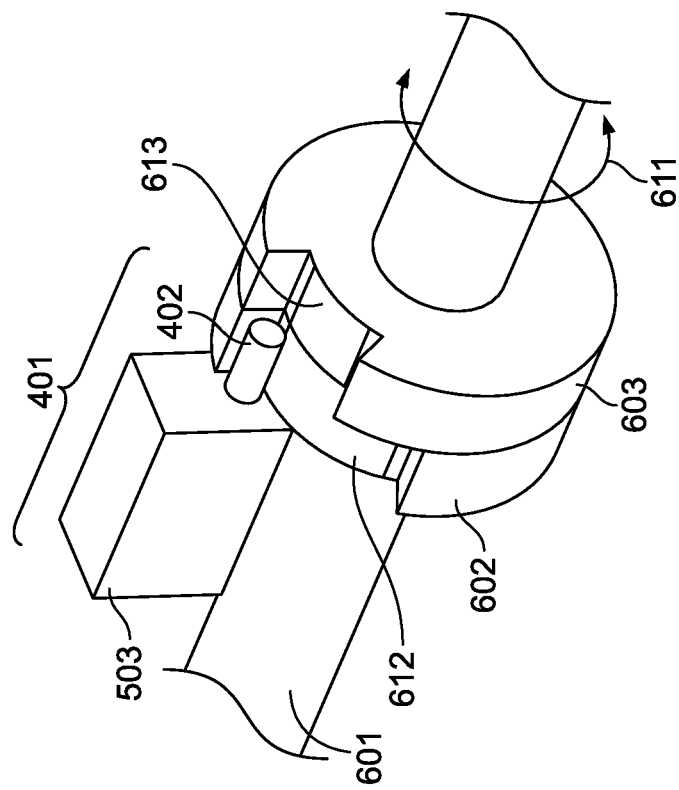
FIGS. 6A and 6B are examples of rotation limiting discs in accordance with aspects of the disclosure.
Figure 6A:
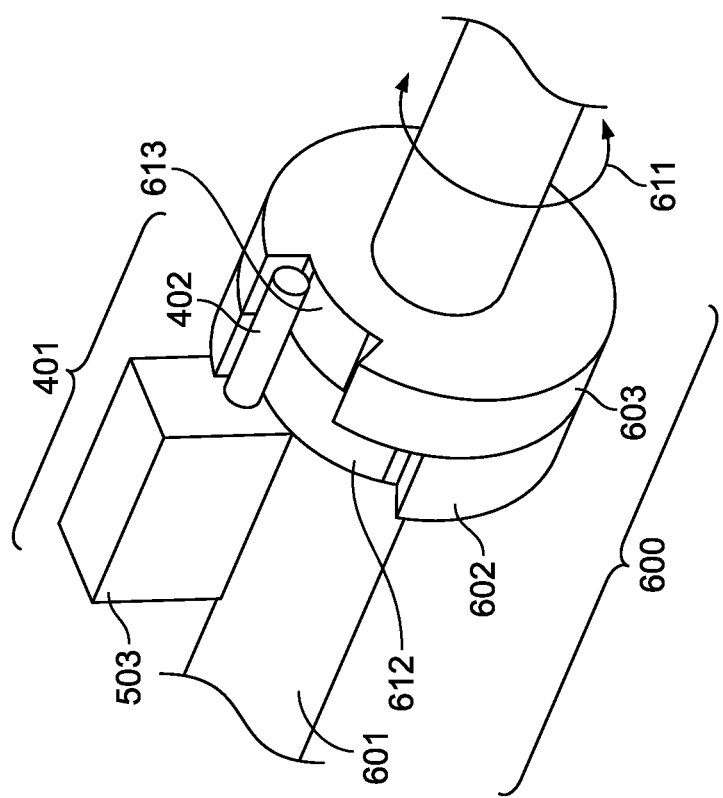

The recline controls may include rotation limiting discs which limit the rotation of a seat to within a predefined recline range based upon the size of a cutout on the discs. In this regard, each rotation limiting disc may include a cutout in which a blocking component may be positioned. The recline controls may control the amount of rotation a seat back may move by positioning the blocking component within rotation limiting discs having different cutout sizes. For instance, FIGS. 6A and 6B show the interior of an example recline control 600, which may be compared to recline controls 403, including a hinge 601 around which a seat back may rotate in the directions illustrated by arrows 611. Two rotation limiting discs 602 and 603, having respective cutouts 612 and 613, are positioned on the hinge 601, adjacent to each other. Each rotation limiting disc may have the same or a different cutout size which allow the hinge 601 to rotate a respective distance before the blocking component 402 prevents further rotation. For instance, and as shown in FIGS. 6A and 6B, cutout 613 is smaller than cutout 612. As such, when blocking component 402 is positioned by an actuator, such as actuator 503, within cutouts 612 and 613, rotation of the hinge 601 is limited to the size of the smaller cutout 613, as shown in FIG. 6A.

The pin of the locking mechanism may be retracted from the rotation disc having the smaller cutout size by the actuator upon an optional restraining device being buckled, attached and/or otherwise activated. In this regard, the amount of rotation the seat back (not shown) may be adjusted by positioning the blocking component in discs having larger cutouts and removing the blocking component from discs having smaller cutouts, or vice versa. For instance, as illustrated in FIG. 6B, the locking mechanism 401, including an actuator 503 and blocking component 402 comprising a pin, is positioned such that the blocking component 402 is retracted from cutout 613 and positioned within only cutout 612. As such, the rotation range of the seat back (not shown) is increased relative to when the blocking component 402 is positioned within the smaller cutout 613.

In some instances, upon buckling the optional restraining device, a spring loaded feature could pull the blocking component 402 out of the rotation limiting disc having the smaller cutout (i.e., rotation limiting disc 603,) such that the blocking component 402 is only in the disc with the larger cutout (i.e., rotation limiting disc 602,) thereby increasing the rotation range of the seat back. Although the examples shown in FIGS. 6A and 6B show two rotation limiting discs, any number of rotation limiting discs may be used.

In instances where recline controls are electronically operated, the seat control system may provide instructions to the recline controls 403 which instruct the recline controls 403 how far the seat back may be reclined. In this regard, the recline controls 403 may operate as the locking mechanism 401 by preventing the seat back from reclining further than a particular angle, such as 30 degrees from vertical, or more or less. A rotation sensor may monitor the angle of the seat back and provide the controller of the seat control system with data containing the angle. For instance, as shown in FIGS. 5A and 5B, a rotation sensor 550 may be a proximity sensor configured to detect a ridge or other protruding feature on or within the seat, recline controls, or elsewhere. In the event the seat rotates and the ridge comes in range of the rotation sensor 550, the rotation sensor 550 may trigger a stop of the actuator. Buckling or otherwise attaching the optional restraining device may override the rotation sensor feedback and allow the seat to rotate to its full extent.

Based upon the monitored angle of the seat back, and whether or not the optional restraining device is attached, the seat control system may instruct the recline controls to prevent or allow further rotation of the seat back. For instance, when the optional restraining device is not worn by a passenger (i.e., not buckled), the recline controls 403 may be instructed by the seat control system to prevent rotation of the seat beyond a predefined angle, such as angle 'Y', as illustrated in FIG. 5B. Angle Y may be 30 degrees from vertical, or more or less. In instances where the optional restraining device is worn, the seat control system may receive a triggering signal from the sensor, and in response, provide instructions to the recline controls to allow full rotation. In some instances, mechanically and electronically operated recline controls may be implemented.

Figure 7B:
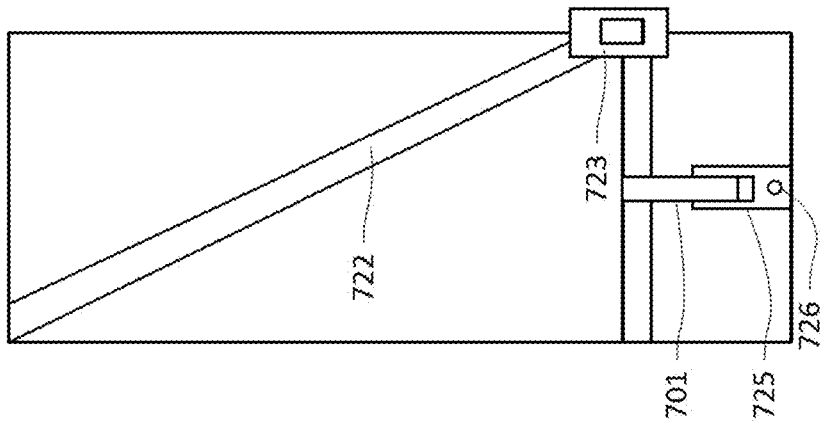
FIGS. 7A and 7B are examples of an optional restraining device in accordance with aspects of the disclosure.
Figure 7A:
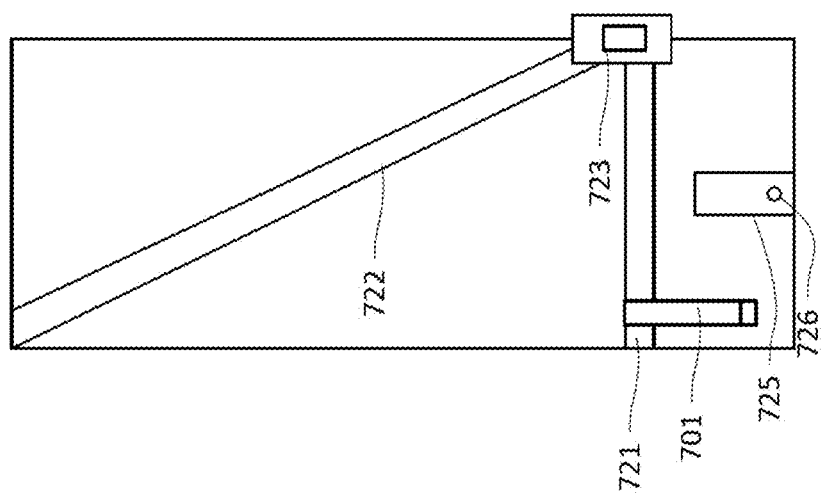

The optional restraining device may be any device capable of preventing submarining. In this regard, the optional restraining device may be one or more straps. The straps may be buckled or otherwise connected to a buckle or other attachment point between the passenger's legs and/or around the passenger's shoulders. In some instances the optional restraining devices may be incorporated into the vehicle's seatbelt. For instance, the optional restraining device may be an additional strap 701 having a tongue and incorporated into the lap belt of a three-point seatbelt 722, which may be compared to three-point seatbelt 422. The restraining device may have a buckle, such as buckle 723 as shown in FIG. 7A for attaching the three-point seatbelt 722. The additional strap 701 may be looped onto the lap belt 721 such that it may slide into and out of an engagement position between the passenger's legs and/or lower torso. Once in the engagement position, the additional strap 701 may be attached to a separate buckle 725, as shown in FIG. 7B. The separate buckle 725 may include a sensor 726 for detecting when the additional strap 701 is attached to the separate buckle 725.

FIG. 8A shows an example optional restraining device which includes two straps, 802 and 804, that convert a three-point seatbelt 822 with a center buckle 825 into a five-point harness. In this regard, the two straps 802 and 804 may be configured to connect to the central buckle 825, with a first, leg strap 804 being positioned between the passenger's legs and a second shoulder strap 802 going around one of the passenger's shoulders. In some instances, the optional restraining device of FIGS. 8A and 8B may include only a single optional strap, such as only the first strap 804 or second strap 802.

When not in use, the straps of the optional restraining device may be stored such that they are not loose and/or not in the way of the passenger. For illustration, the two straps 802 and 804 shown in FIGS. 8A and 8B may be attached to retractors which store the straps within the seat or other portion of the vehicle. In some instances, the straps may be attached to a mount away from or on the strap, such as with a buckle or latch such that the strap is secured away from the passenger.

Figure 9:
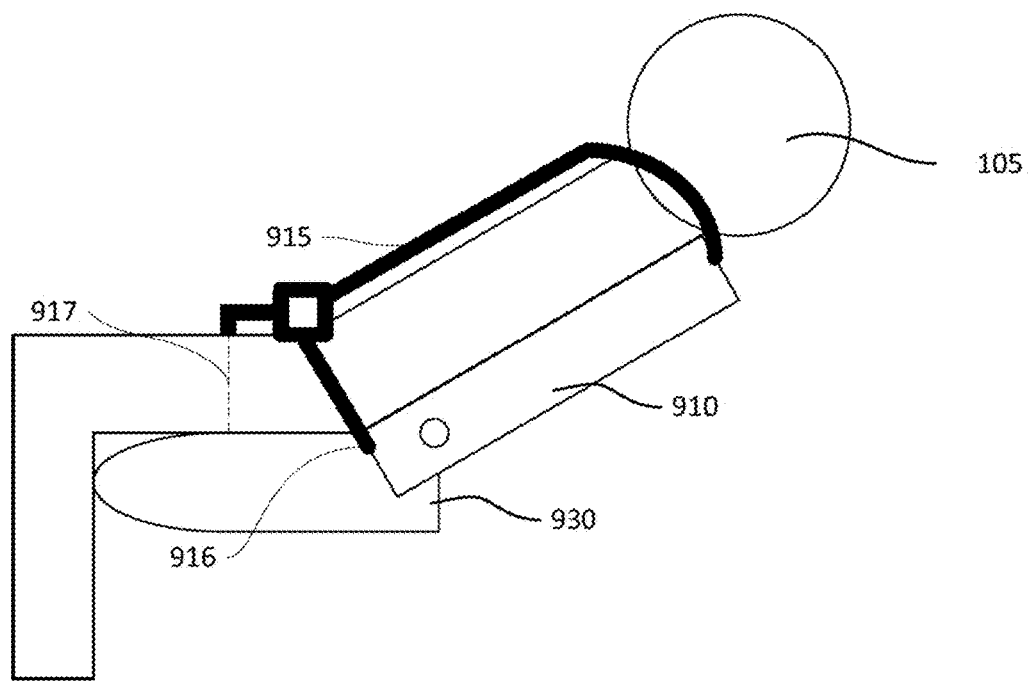
FIG. 9 is an example of an optional restraining device attached to a seat in accordance with aspects of the disclosure.

The restraining device and optional restraining device may be mounted to the vehicle chassis and/or the seat. In this regard, to allow the upper torso belt 915 of a restraining device and/or optional restraining device to recline with the passenger, the upper torso belt 915 may be mounted to the seat back 910 of seat 930, which may be compared to seats 130 and 430, as shown in the example of FIG. 9. As further shown in FIG. 9, lap belts 916 and optional restraining device 917 may also be secured to the seat 930. In instances where the restraining device or optional restraining device is mounted to the chassis or other portion of the vehicle, the connection point of the restraining device may be configured to travel along the seat as it reclines. In this regard, a track or pulley system may be used to allow the connection point of the restraining device to move with the seat as it reclines.

Figure 10A:
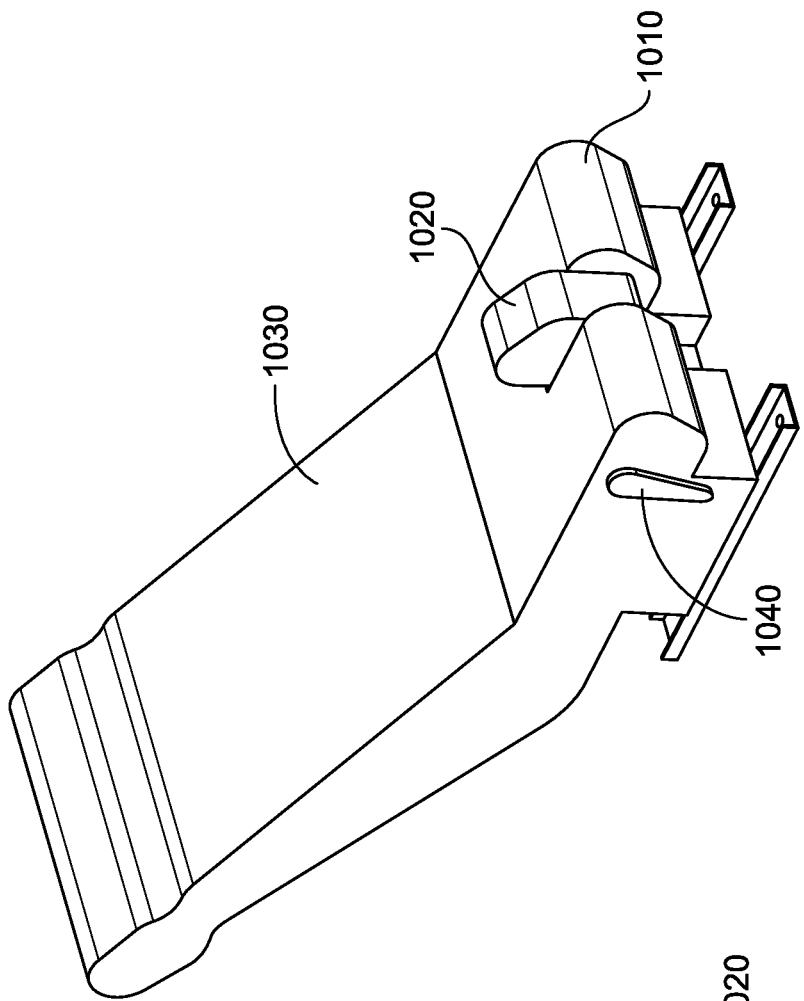
FIGS. 10A and 10B are examples of an optional restraining device integrated into a seat in accordance with aspects of the disclosure.
Figure 10B:
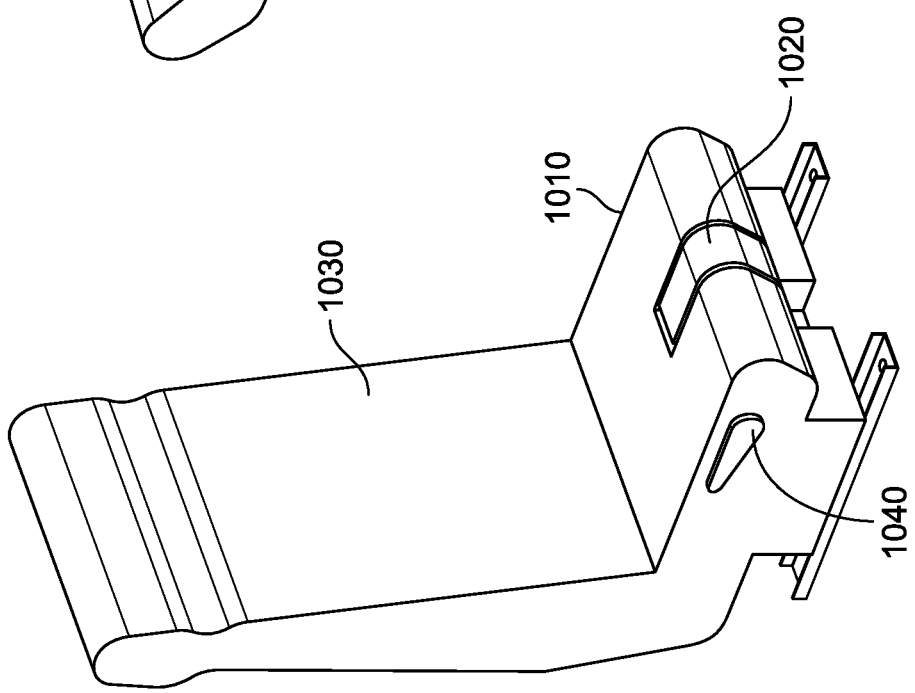

In some instances, the seat may include an integrated optional restraining device that that could be rotated or translated between the passenger's legs to prevent submarining. For instance, as shown in the examples of FIGS. 10A and 10B, a vehicle seat 1030, which may be compared to seat 130 and 430, may include an integrated optional restraining device 1020 attached to a lever 1040. The integrated optional restraining device 1020 may be comprised of a portion of the seat, or other such component capable of rotating between the passengers legs at a height high enough relative to the base 1010 of the seat to prevent the passenger from submarining. When the lever 1040 is in a closed position, a locking mechanism (not shown) may prevent the seat from rotation beyond a predefined range, such as between 0 and 30 degrees from vertical, or more or less. Upon the lever 1040 being rotated, the integrated optional restraining device 1020 may move into an engaged position, as shown in FIG. 10B. Once in the engaged position, the locking mechanism may allow the seat 1030 to fully rotate, as further shown in FIG. 10B.

In some instances, the integrated optional restraining device 1020 may be configured to automatically move into position as the seat 1030 is rotated into a reclined position. For instance, as a passenger reclines the seat to or near a predefined angular distance, such as 30 degrees from vertical, or more or less, the integrated optional restraining device 1020 may automatically deploy to prevent submarining. Although the foregoing examples are described with regard to allowing a seat to recline upon an optional restraining device being worn, the submarining avoidance system may also be used to prevent a passenger from rotating a seat from a forward position unless the optional restraining device is connected. In this regard, the optional restraining device may protect a passenger positioned away from the forward position more so than a typical restraining device, such as a three-point seatbelt. As such, the submarining avoidance system may prevent the seat from rotating until the optional restraining device is connected.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for reducing a likelihood of a passenger submarining under a restraining device when reclined in a seat of a vehicle, the system comprising:
   a first restraining device for restraining the passenger; and
   one or more processors configured to prevent a seat back of the seat from reclining beyond a predefined angle unless the first restraining device is activated.

2. The system of claim 1, further comprising a locking mechanism configured to prevent the seat back of the seat from reclining beyond a predefined angle unless a first signal is received from the one or more processors, and
   wherein the one or more processors are further configured to send the first signal based on the first restraining device being activated.

3. The system of claim 2, wherein the locking mechanism is configured to allow the seat back to recline beyond the predefined angle if the first signal is received from the one or more processors.

4. The system of claim 2, wherein the locking mechanism includes a brake for preventing rotation of the seat back.

5. The system of claim 2, wherein the locking mechanism includes an actuator and a blocking component.

6. The system of claim 5, wherein the locking mechanism includes one or more cutout plates, each cutout plate having a cutout, and
   wherein the actuator is configured to position the blocking component in the cutouts of the one or more cutout plates.

7. The system of claim 1, further comprising a recline control configured to control the angle of the prevent the seat back of the seat, and to prevent the seat back of the seat from reclining beyond a predefined angle unless a first signal is received from the one or more processors, and
   wherein the one or more processors are further configured to send the first signal based on the first restraining device being activated.

8. The system of claim 7, wherein:
   if the seat back of the seat is reclined beyond a predefined angle, the recline control is further configured to cause the seat back of the seat to move so that it is reclined within the predefined angle in response to a second signal from the one or more processors; and
   the one or more processors are further configured to send the second signal based on the first restraining device being deactivated.

9. The system of claim 1, wherein the first restraining device includes a strap, wherein a first end of the strap is attached to the seat and a second, opposite end includes a tongue.

10. The system of claim 9, further comprising a buckle mounted to the seat, wherein the strap is looped onto a lap belt of a second restraining device, and wherein the first restraining device is activated upon the tongue being buckled into the buckle.

11. The system of claim 1 further comprising a buckle, wherein the first restraining device includes a shoulder strap and a leg strap.

12. The system of claim 11, wherein:
   a first end of the leg strap is attached to the seat and a second, opposite end of the leg strap includes a first tongue;
   a first end of the shoulder strap is attached to the seat and a second, opposite end of the shoulder strap includes a second tongue; and
   the first restraining device is activated upon the first and second tongues being buckled into the buckle.

13. The system of claim 1, wherein the first restraining device is integrated into a base of the seat.

14. The system of claim 13, wherein:
   the first restraining device is attached to a lever, and upon the lever being rotated, the first restraining device is rotated above the base of the seat; and
   the first restraining device is activated upon being rotated above the base of the seat.

15. The system of claim 13, wherein:
   the first restraining device is configured to automatically rotate above the base of the seat as the seat back approaches or reaches the predefined angle; and
   the first restraining device is activated upon being rotated above the base of the seat.

16. The system of claim 1, wherein the predefined angle is around 30 degrees from vertical relative to the base of the vehicle.

17. The system of claim 1 further comprising a sensor, wherein the sensor is configured to determine whether the first restraining device is activated.

18. The system of claim 17, wherein the sensor is mounted within a buckle and the first restraining device is configured to attach to the buckle.

19. The system of claim 1, further comprising a rotation sensor configured to monitor the angle of the seat back of the seat.

20. A system for reducing a likelihood of a passenger submarining under a restraining device when reclined in a seat, the system comprising:
   a first restraining device for restraining the passenger within the seat;
   a second restraining device for preventing the passenger from submarining under the first restraining device; and
   one or more processors configured to prevent a seat back of the seat from reclining beyond a predefined angle unless the second restraining device is activated.

* * * * *